(12) United States Patent
Choi et al.

(10) Patent No.: US 12,388,550 B2
(45) Date of Patent: Aug. 12, 2025

(54) METHOD FOR SYNCHRONIZING TIME IN MULTIPLE TIME DOMAINS, AND APPARATUS IMPLEMENTING THE SAME METHOD

(71) Applicant: HYUNDAI AUTOEVER CORP., Seoul (KR)

(72) Inventors: Sung Jin Choi, Seoul (KR); Doo Hyun Moon, Seoul (KR); Sun Yul Kim, Seoul (KR); Ye Ji Park, Seoul (KR); Seung Ho Lee, Seoul (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 433 days.

(21) Appl. No.: 18/078,541

(22) Filed: Dec. 9, 2022

(65) Prior Publication Data
US 2023/0198651 A1 Jun. 22, 2023

(30) Foreign Application Priority Data
Dec. 16, 2021 (KR) .......................... 10-2021-0180389

(51) Int. Cl.
*H04J 3/06* (2006.01)
*H04L 7/00* (2006.01)

(52) U.S. Cl.
CPC .......... *H04J 3/0667* (2013.01); *H04J 3/0682* (2013.01); *H04L 7/0033* (2013.01)

(58) Field of Classification Search
CPC ...... H04J 3/0667; H04J 3/0682; H04L 7/0033
See application file for complete search history.

(56) References Cited

U.S. PATENT DOCUMENTS

| | | | |
|---|---|---|---|
| 10,404,393 B2 * | 9/2019 | Ha | H04J 3/0667 |
| 10,484,163 B2 * | 11/2019 | Tanwar | H04J 3/0667 |
| 11,444,747 B2 * | 9/2022 | Tanwar | H04L 7/0033 |

(Continued)

FOREIGN PATENT DOCUMENTS

| | | |
|---|---|---|
| JP | 2015099983 A | 5/2015 |
| JP | 2019080288 A | 5/2019 |
| JP | 6682666 B2 | 4/2020 |

(Continued)

OTHER PUBLICATIONS

Notice of Allowance cited in corresponding Korean patent application No. 10-2021-0180389; Jun. 30, 2023; 4 pp.

*Primary Examiner* — Chandrahas B Patel
(74) *Attorney, Agent, or Firm* — Lempia Summerfield Katz LLC

(57) ABSTRACT

A slave node calculates and stores a propagation delay generated when exchanging a message with a master node. The master node transmits a reference time indicated by a hardware clock of the master node, and the slave node synchronizes a hardware clock of the slave node to the reference time indicated by the hardware clock of the master node. The master node transmits a time value in a first time domain to the slave node, where the time value is calculated by the master node by adding an offset of the first time domain to the reference time. The slave node calculates the offset using the time value and the stored propagation delay, and obtains a time in the first time domain by applying the calculated offset to a reference time indicated by the hardware clock of the slave node.

20 Claims, 10 Drawing Sheets

(56) References Cited

U.S. PATENT DOCUMENTS 12,204,291 B2 * 1/2025 Arai ................ G04G 5/002
2016/0028488 A1 1/2016 Yu

FOREIGN PATENT DOCUMENTS

| KR | 20130061512 A | 6/2013 |
| KR | 20160014157 A | 2/2016 |
| KR | 20190013077 A | 2/2019 |

* cited by examiner

METHOD FOR SYNCHRONIZING TIME IN MULTIPLE TIME DOMAINS, AND APPARATUS IMPLEMENTING THE SAME METHOD

CROSS-REFERENCE TO RELATED APPLICATION

This application claims the benefit of and priority to Korean Patent Application No. 10-2021-0180389, filed on Dec. 16, 2021, the entire contents of which are incorporated herein by reference.

FIELD

Embodiments of the present disclosure relate to a method of synchronizing time across a plurality of time domains, and an apparatus implementing the same method. More particularly, embodiments of the present disclosure relate to a method of synchronizing time across a plurality of time domains between multiple nodes that constitute a network, and an apparatus implementing the same method.

BACKGROUND

Network Time Protocol (NTP) is a networking protocol for clock synchronization between computer systems over packet-switched and variable latency data networks.

Precision Time Protocol (PTP) is a protocol that synchronizes the clocks of network devices using a master-slave hierarchy and uses a hardware time stamp to provide a higher level of clock accuracy than NTP, allowing clocks to be synchronized in less than 1 microsecond.

PTP uses master and slave layers similar to those used in NTP, wherein the most accurate clock available is called the master clock, and a slave device synchronizes its clock by using the signal of the master device.

PTP defined in the current 802.1AS-2011 (gPTP) standard lacks a specification for the synchronization of multiple time domains.

Conventional PTP has dealt with the need of the nodes in a network for multiple time zones in a situation where the entire network belongs to one time domain by using a method of physically reconfiguring the network by adding a separate hardware device for time synchronization. This is disadvantageous in that it increases the cost and consumption of resources for synchronization of time across a plurality of time domains by using PTP. The foregoing is intended merely to aid in the understanding of the background of the present disclosure, and is not intended to mean that the present disclosure falls within the purview of the related art that is already known to those having ordinary skill in the art.

SUMMARY

Aspects of the present disclosure provide a method of synchronizing time across a plurality of time domains, which is capable of PTP-based time synchronization in multiple time domains between a master node and a slave node, and an apparatus for implementing the same method.

Other aspects of the present disclosure provide a method of synchronizing time across a plurality of time domains, which can provide a new PTP standard with an added specification related to the synchronization of multiple time domains which is not included in the current 802.1AS-2100 (gPTP) standard, and an apparatus for implementing the same method.

Yet other aspects of the present disclosure provide a method of synchronizing time across a plurality of time domains when implementing an autonomous driving platform, which can establish a stable and flexible vehicle network for supporting multiple time domains, and an apparatus for implementing the same method.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided a method of synchronizing time across a plurality of time domains between a master node and a slave node. The method comprises calculating and storing, by a precision time protocol (PTP) layer of the slave node, a propagation delay generated when exchanging a message with the master node, transmitting, by a PTP layer of the master node, a reference time indicated by a hardware clock of the master node to the PTP layer of the slave node, synchronizing, by the PTP layer of the slave node, a hardware clock of the slave node to the reference time indicated by the hardware clock of the master node, transmitting, by the PTP layer of the master node, a time value in a first time domain among the plurality of time domains to the PTP layer of the slave node, wherein the time value in the first time domain is calculated, by the PTP layer of the master device, by adding an offset of the first time domain to the reference time, calculating, by the PTP layer of the slave node, the offset of the first time domain by using the time value in the first time domain and a stored propagation delay from the calculating and storing of the propagation delay, and obtaining, by the PTP layer of the slave node, the time in the first time domain by applying a calculated offset of the first time domain to a reference time indicated by the hardware clock of the slave node.

According to an aspect of the present disclosure, there is provided a non-transitory computer-readable medium storing a computer program including computer-executable instructions for causing, when executed in a computing device, the computing device to perform the methods.

According to an aspect of the present disclosure, there is provided a computing device for synchronizing time across a plurality of time domains between a master node and a slave node. The computing device comprises one or more processors, a communication interface configured to communicate with external devices, a memory configured to load a computer program that is executed by the processor, and a storage configured to store the computer program, wherein the computer program includes computer-executable instructions for causing, when executed in the computing device, the computing device to perform operations comprising: calculating and storing, by a precision time protocol (PTP) layer of the slave node, a propagation delay generated when exchanging a message with the master node, transmitting, by a PTP layer of the master node, a reference time indicated by a hardware clock of the master node to the PTP layer of the slave node, synchronizing, by the PTP layer of the slave node, a hardware clock of the slave node to the reference time indicated by the hardware clock of the master node, transmitting, by the PTP layer of the master node, a time value in a first time domain among the plurality of time domains to the PTP layer of the slave node, wherein the time value in the first time domain is calculated, by the PTP layer of the master node, by adding an offset of the first time domain to the reference time, calculating, by the PTP layer of the slave node, the offset of the first time domain by using the time value in the first time domain and a stored propagation delay from the calculating and storing of the propagation delay, and obtaining, by the PTP layer of the slave node, the time in the first time domain by applying a calculated offset of the first time domain to a reference time indicated by the hardware clock of the slave node.

BRIEF DESCRIPTION OF THE DRAWINGS

In order that the disclosure may be well understood, there will now be described various forms thereof, given by way of example, reference being made to the accompanying drawings, in which.

DETAILED DESCRIPTION OF THE EMBODIMENTS

Figure 1:
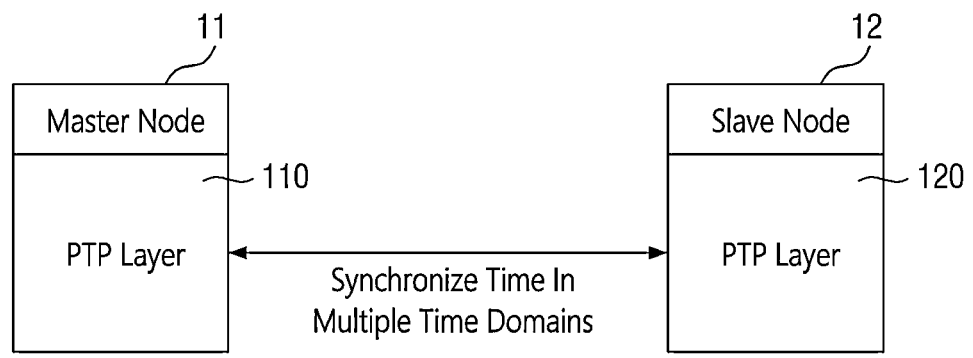
FIG. 1 is a diagram of a system configuration for PTP-based time synchronization for multiple time domains according to an embodiment of the present disclosure.

Hereinafter, embodiments of the present disclosure are described in detail with reference to the accompanying drawings. The advantages and features of the present disclosure and methods of accomplishing the same may be understood more readily by reference to the following detailed description of embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In the drawings, the same reference numerals are assigned to the same components even when they are shown in different drawings. In addition, in describing embodiments of the present disclosure, when it is determined that the detailed description of the related well-known configuration or function may obscure the gist of the embodiments, the detailed description thereof is omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof. When a component, device, element, or the like of the present disclosure is described as having a purpose or performing an operation, function, or the like, the component, device, or element should be considered herein as being "configured to" meet that purpose or to perform that operation or function.

FIG. 1 is a diagram of a system configuration for PTP-based time synchronization for multiple time domains according an embodiment of the present disclosure. Referring to FIG. 1, the system includes PTP-based network devices of a master node 11 and a slave node 12, in the illustrated embodiment.

The master node 11 and the slave node 12 each include, as a component, a PTP layer for synchronizing time in each of a plurality of time domains based on PTP. The master node 11 includes a PTP layer 110, and the slave node 12 includes a PTP layer 120.

In an embodiment, the PTP layer 120 of the slave node 12 is configured to calculate a propagation delay generated during message transmission/reception with the master node 11, and to use the calculated propagation delay to synchronize a hardware clock of the slave node 12 with a reference time indicated by a hardware clock of the master node 11.

Additionally, the PTP layer 120 of the slave node 12 may be configured to calculate an offset for each of the time domains by using i) a time value, in each time domain, transmitted from the PTP layer 110 of the master node 11 and ii) a propagation delay calculated in advance. In an aspect, the slave node 12 may be configured to obtain the time in each time domain by applying the offset of each time domain to the hardware clock of the slave node 12.

Accordingly, the present disclosure may use the PTP-based configuration of the master node and the slave node as described above to synchronize the time across a plurality of time domains.

Figure 2:
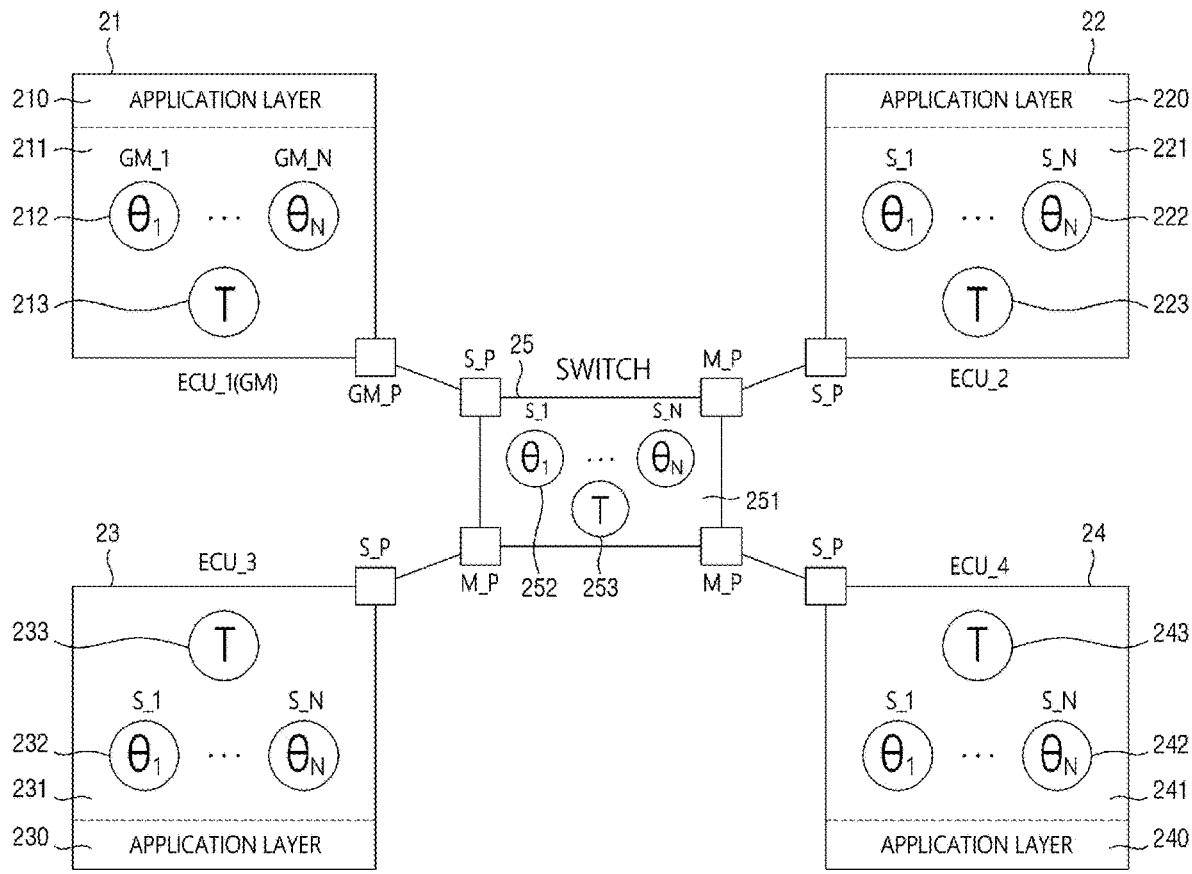
FIG. 2 is a diagram of a configuration of a vehicle network apparatus, according to an embodiment of the present disclosure.

FIG. 2 is a diagram of a configuration of a vehicle network apparatus, according to an embodiment of the present disclosure. Referring to FIG. 2, the vehicle network apparatus includes a plurality of electronic control units, including ECU_1 21, ECU_2 22, ECU_3 23, and ECU_4 24, and a network switch 25 for transmitting and receiving data between the electronic control units. The electronic control units 21, 22, 23, 24 and the network switch 25 may each be designated as a master node or a slave node.

The electronic control units 21, 22, 23, 24 include application layers 210, 220, 230, 240 and PTP (Precision Time Protocol) layers 211, 221, 231, 241. The network switch 25 includes a PTP layer 251. The PTP layers 211, 221, 231, 241 may each provide an interface including function call functionality for setting and obtaining a time value for each of the time domains and setting and obtaining an offset for each of the time domains, to each of the application layers 210, 220, 230, 240 corresponding to an upper layer of the PTP layer.

The PTP layers 211, 221, 231, 241, 251 may each synchronize each of reference times 213, 223, 233, 243 indicated by the hardware clocks between the master node and the slave node, and control the setting and obtaining of each of offsets 212, 222, 232, 242 of a plurality of time domains, and thereby synchronize time across the time domains between the master node and the slave node.

According to the above-described configuration of the vehicle network apparatus, embodiments of the present disclosure can establish a stable and flexible vehicle network for supporting multiple time domains in a plurality of electronic control units (ECUs) and network switches.

Figure 3:
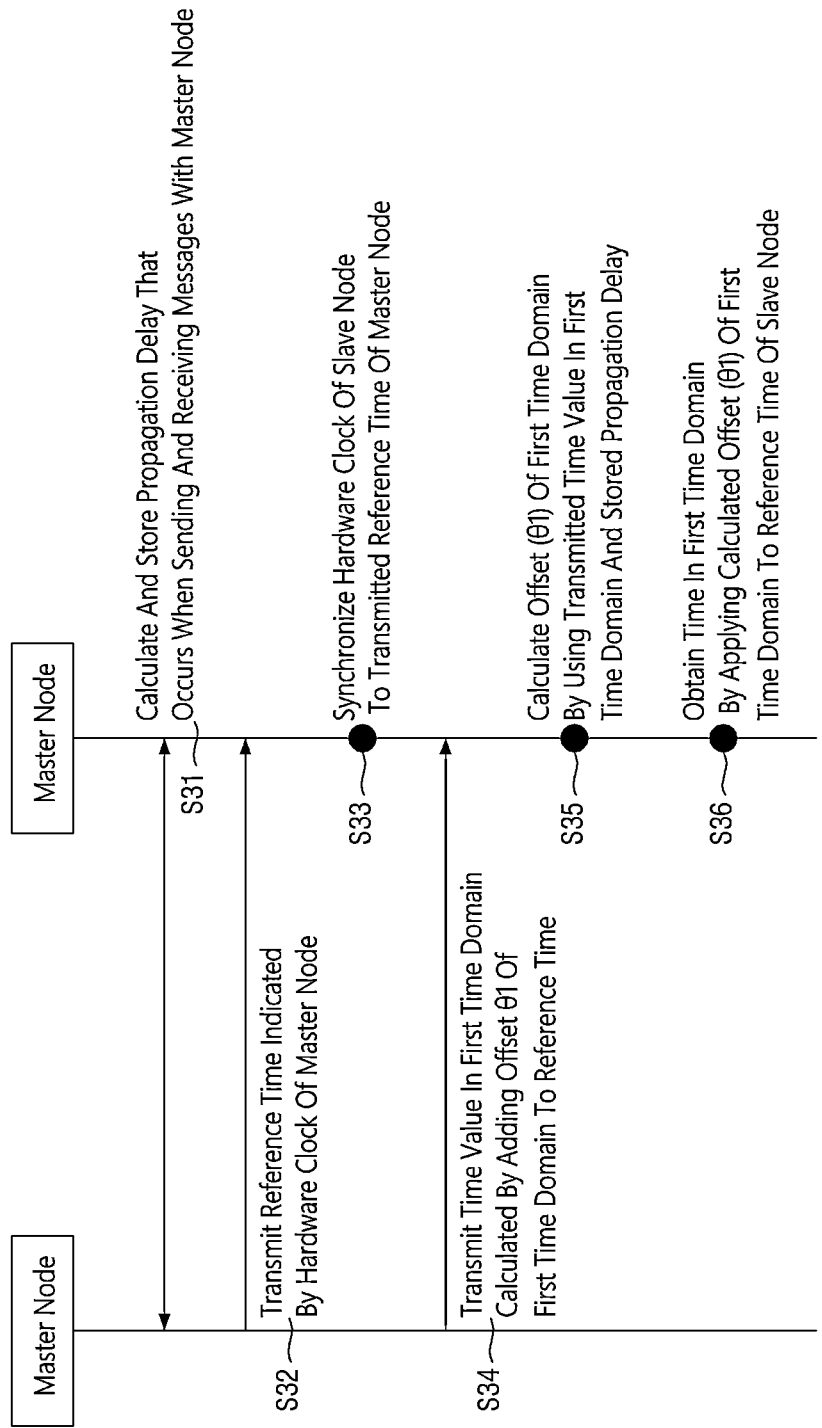
FIG. 3 is a flowchart of a method of synchronizing time across a plurality of time domains between a master node and a slave node, according to an embodiment of the present disclosure.

FIG. 3 is a flowchart of a method for synchronizing time across a plurality of time domains between a master node and a slave node, according to an embodiment of the present disclosure. The respective operation steps as shown in FIG. 3 may be performed by the components of FIG. 2.

Referring to FIG. 3, in Step S31, the PTP layer of the slave node calculates and stores a propagation delay generated when exchanging a message with the master node.

Figure 4:
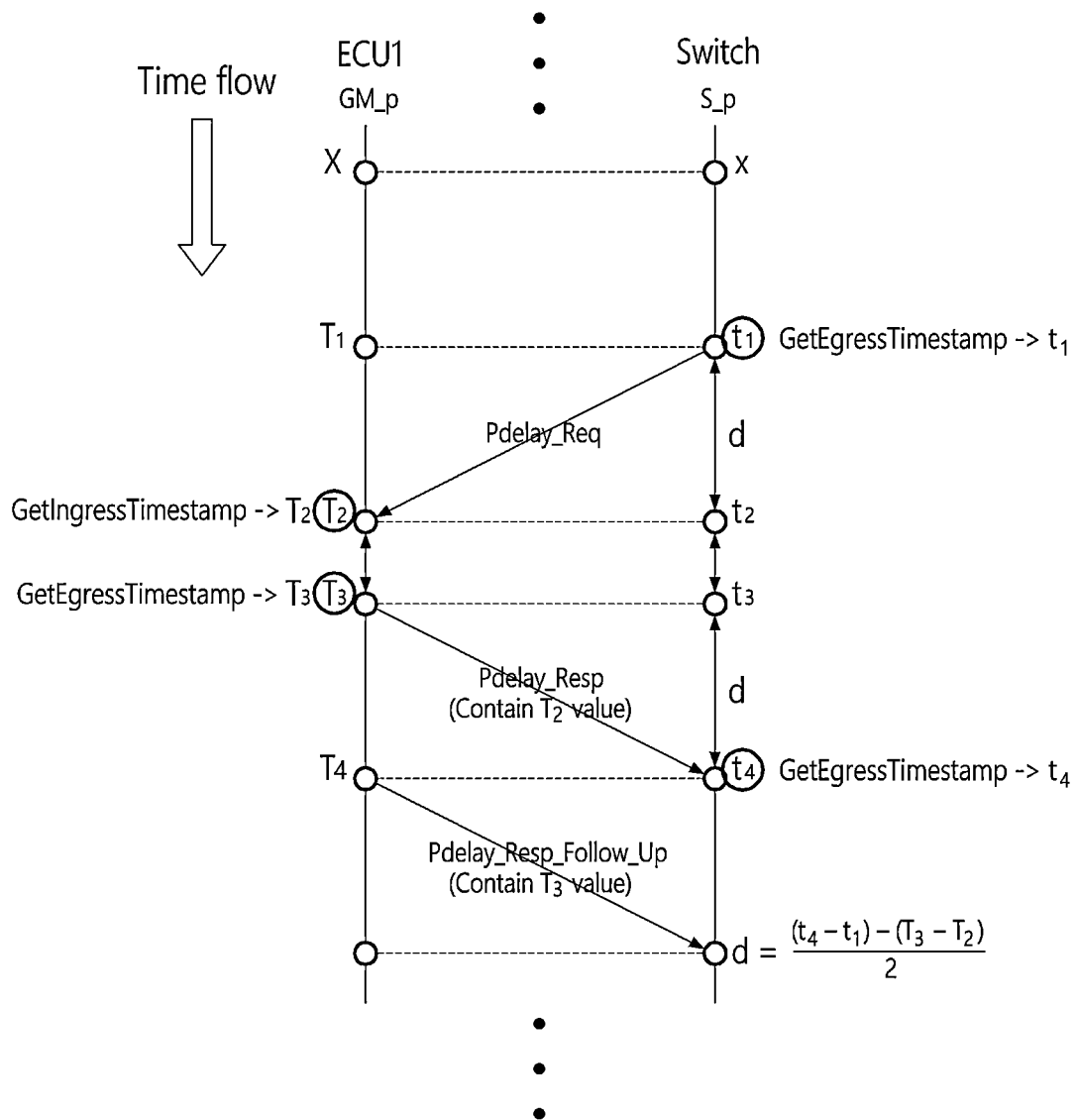
FIG. 4 illustrates an example calculation of a propagation delay occurring when a message is transmitted between a master node and a slave node, according to some embodiments of the present disclosure.

As an example, as shown in FIG. 4, when the master node GM_p is ECU1 and the slave node S_p is the switch, the PTP layer of the slave node may calculate and store a propagation delay 'd'.

For example, the PTP layer of the slave node S_p may transmit, to the master node GM_p, a Pdelay_Req signal including information on a reference time t1 indicated by the hardware clock.

The PTP layer of the slave node S_p may obtain information on a reference time T2 at which the PTP layer of the master node receives the Pdelay_Req signal and information on a reference time T3 at which the PTP layer of the master node transmits, to the PTP layer of the slave node, a Pdelay_Resp signal corresponding to the Pdelay_Req signal. Additionally, the PTP layer of the slave node S_p may obtain information on a reference time t4 at which the PTP layer of the slave node receives the Pdelay_Resp signal from the master node.

The PTP layer of the slave node S_p may calculate and save the propagation delay 'd' by using the difference between the reference times t1 and t4 and the difference between the reference times T2 and T3, thereby making the stored propagation delay 'd' available for use in calculation of the offset of each of the plurality of time domains.

In Step S32, the PTP layer of the master node transmits a reference time indicated by a hardware clock of the master node to the PTP layer of the slave node, and in Step S33, the PTP layer of the slave node synchronizes a hardware clock of the slave node to the transmitted reference time indicated by the hardware clock of the master node.

Figure 5:
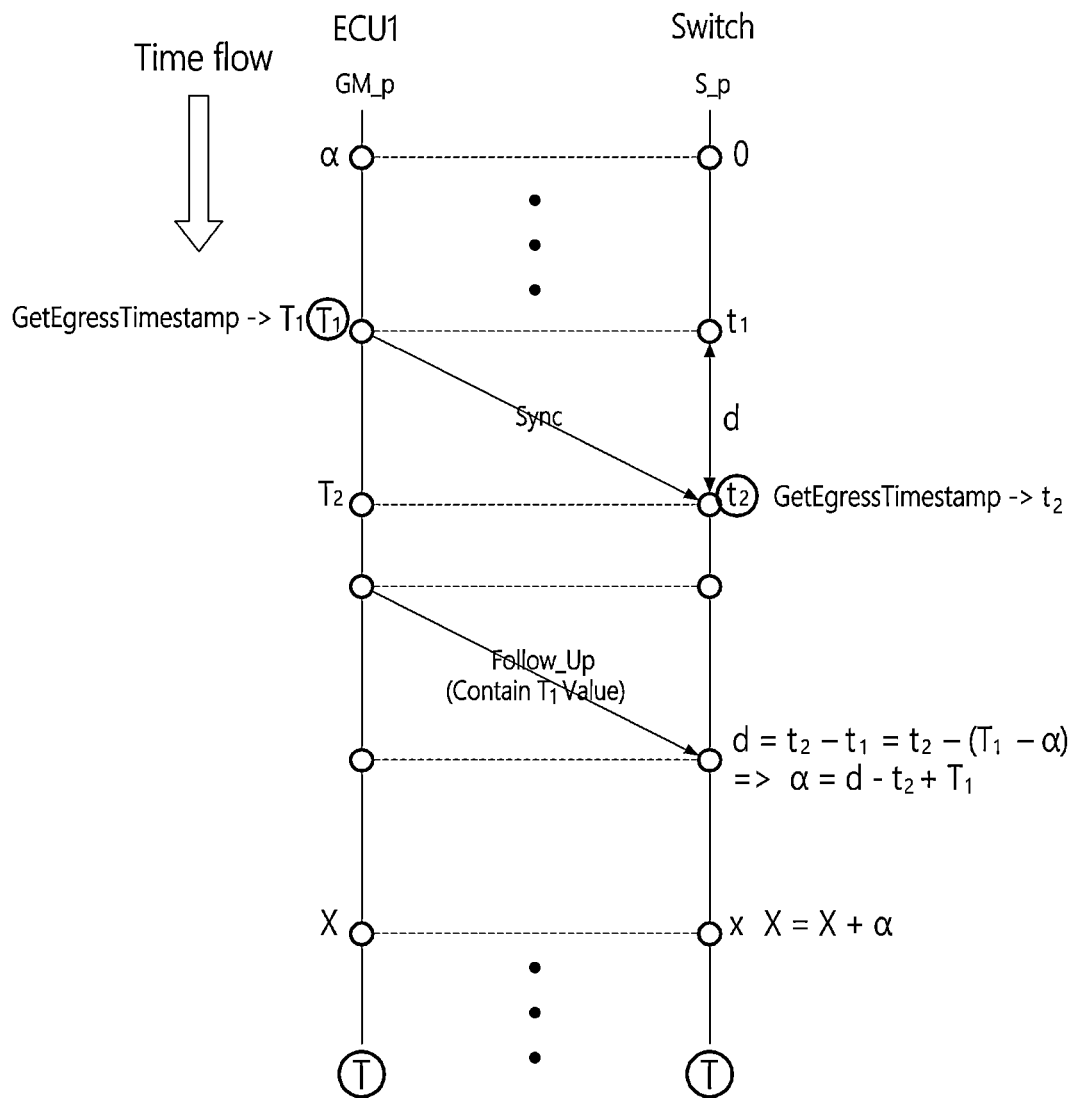
FIG. 5 illustrates the synchronization of a hardware clock of the slave node to the reference time indicated by a hardware clock of the master node, according to some embodiments of the present disclosure.

For example, as shown in FIG. 5, where the master node GM_p is ECU1 and the slave node S_p is the switch, the PTP layer of the master node GM_p may transmit a reference time indicated by a hardware clock of the master node GM_p to the PTP layer of the slave node S_p, and the PTP layer of the slave node S_p may synchronize a hardware clock of the slave node S_p to the transmitted reference time indicated by the hardware clock of the master node GM_p.

In an example, the PTP layer of the master node GM_p may transmit a sync packet to the slave node S_p at reference time T1 indicated by the hardware clock, and then transmit a follow_up packet including information on reference time T1 to the slave node S_p.

The PTP layer of the slave node S_p may calculate the time difference $\alpha$ between the master node GM_p and the slave node S_p by using a reference time t2 at which the sync packet is received from the master node GM_p, the reference time T1 value of the master node GM_p included in the transmitted follow_up packet, and the propagation delay 'd' previously calculated and stored in the example of FIG. 4.

Accordingly, the PTP layer of the slave node S_p may perform pre-correction by applying the calculated time difference $\alpha$ to the hardware clock of the slave node S_p, thereby synchronizing the hardware clock of the slave node S_p with the reference time indicated by the hardware clock of the master node GM_p.

In Step S34, the PTP layer of the master node transmits a time value in a first time domain among the plurality of time domains to the PTP layer of the slave node. The PTP layer of the master node may calculate the time value in the first time domain by adding an offset $\theta1$ of the first time domain to the reference time. In Step S35, the PTP layer of the slave node calculates the offset $\theta1$ of the first time domain by using the time value in the first time domain and the stored propagation delay.

In Step S35, the PTP layer of the slave node obtains the time in the first time domain by applying the calculated offset $\theta1$ of the first time domain to the reference time indicated by the hardware clock of the slave node.

The method may further include operation steps in which i) the PTP layer of the master node transmits a time value in the second time domain to the PTP layer of the slave node, where the time value in the second time domain is calculated, by the PTP layer of the master node, by adding an offset $\theta2$ of the second time domain to the reference time, ii) the PTP layer of the slave node calculates the offset $\theta2$ of the second time domain by using the time value in the second time domain and the stored propagation delay, and iii) the PTP layer of the slave node obtains the time in the second time domain by applying the calculated offset $\theta2$ to the reference time. Likewise, the method may proceed with operation steps of calculating an offset of each of the remaining time domains among the plurality of time domains other than the first time domain and the second time domain and applying the calculated offset to obtain the time in each time domain.

Figure 6:
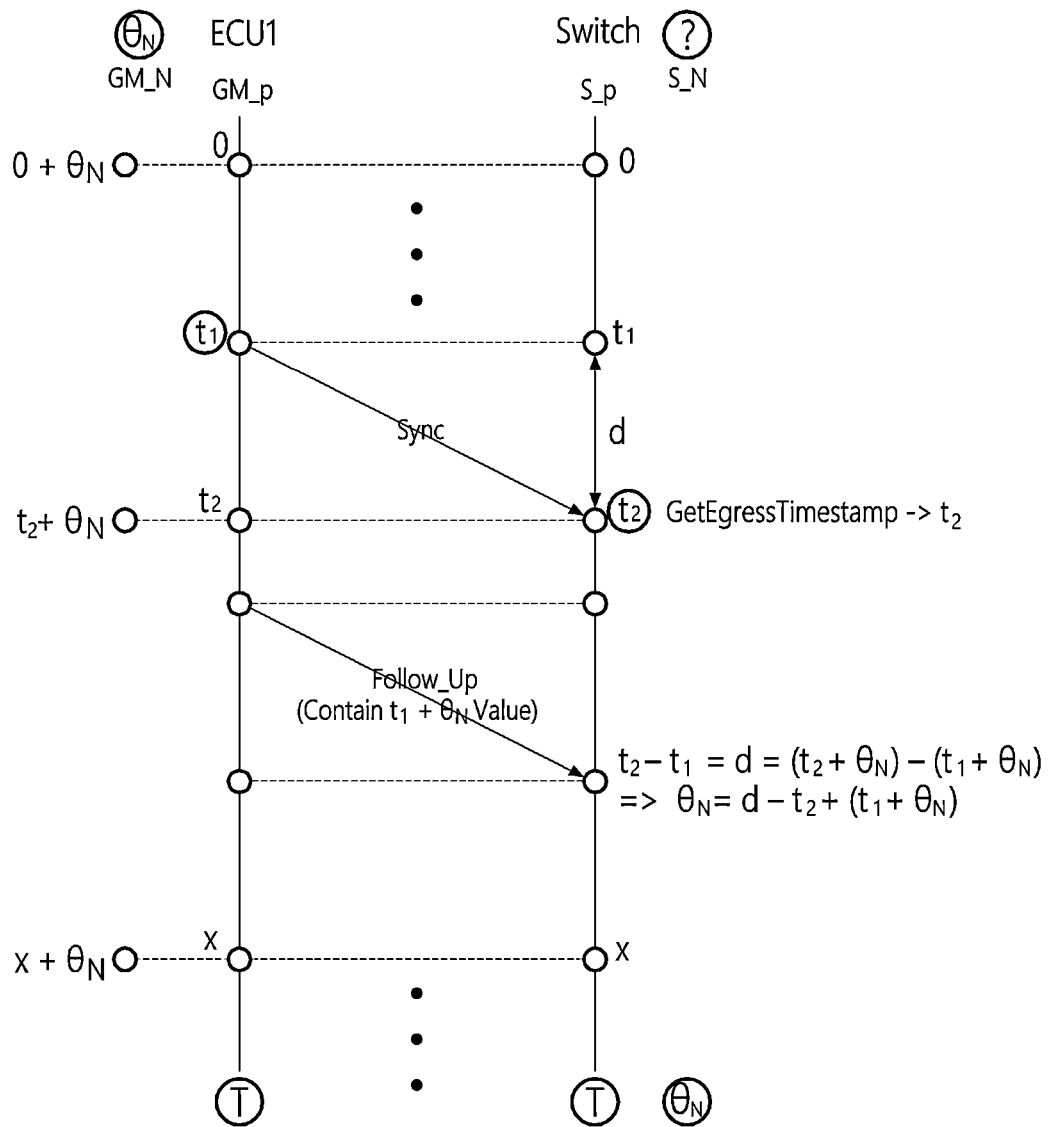
FIG. 6 illustrates calculating an offset for each of the time zones and utilizing the calculated offset for obtaining the time in each time domain, according to some embodiments of the present disclosure.

For example, as shown in FIG. 6, where the master node GM_p is ECU1 and the slave node S_p is the switch, the PTP layer of the master node GM_p may transmit a time value in each of a plurality of time domains to the PTP layer of the slave node S_p, where the time value is calculated by adding the offset of each of a plurality of time domains to the reference time, and the PTP layer of the slave node S_p may calculate the offset of each time domain by using the time value in each time domain and the propagation delay previously calculated and stored in the example of FIG. 4.

In an example, after transmitting a sync packet to the slave node S_p at reference time t1 indicated by the hardware clock, the PTP layer of the master node GM_p may transmit, to the slave node S_p, a follow_up packet including a time value t1+θn in the n-th time domain among the plurality of time domains, where the time value is calculated by adding the offset θn of the n-th time domain to the reference time t1.

The PTP layer of the slave node S_p may calculate the time difference α between the master node GM_p and the slave node S_p and the offset θn in the n-th time domain by using i) the reference time t2 at which the sync packet is received from the master node GM_p, ii) the time value t1+θn in the n-th time domain, which is included in the transmitted follow_up packet, and iii) the propagation delay 'd' previously calculated and stored in the example of FIG. 4.

In an example, the PTP layer of the slave node S_p may perform post-correction to apply the calculated offset θn calculated for the n-th domain to the reference time indicated by the hardware clock, and thereby obtain a time value in the n-th time domain at the slave node S_p.

In an embodiment, the PTP layer may provide an interface for setting and obtaining a time value for each time domain and for setting and obtaining an offset for each time domain, to an application layer that constitutes an upper layer of the PTP layer.

For example, when the application layer of the master node calls a setTime(1, T) function, the PTP layer of the master node may transmit the time value in the first time domain to the PTP layer of the slave node, and when the application layer of the slave node calls a getTime(1) function, the PTP layer of the slave node may return its obtained time as described above in the first time domain.

As another example, when the PTP layer of the master node calls a setOffset(1, θ1) function, the method may set the offset θ1 of the first time domain, and when the PTP layer of the slave node calls the getOffset(1) function, the method may return the offset θ1 of the first time domain calculated by using the time value in the first time domain and the aforementioned stored propagation delay.

According to the above-described methods, embodiments of the present disclosure can synchronize time in multiple time domains between the master node and the slave node based on PTP. Additionally, the present disclosure can provide a new PTP standard with an additional specification related to synchronization for multiple time domains, which is not included in the current 802.1AS-2100 (gPTP) standard.

Figure 7:
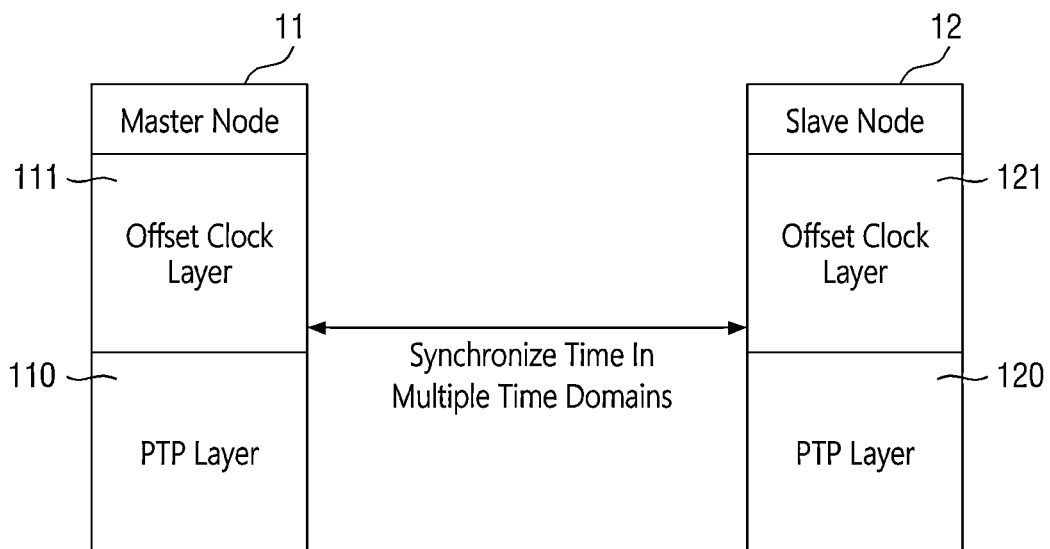
FIG. 7 is a diagram of a system configuration for PTP-based time synchronization for multiple time domains performed by using an offset clock layer, according to another embodiment of the present disclosure.

FIG. 7 is a diagram of a system configuration for PTP-based time synchronization for multiple time domains performed by using an offset clock layer, according to another embodiment of the present disclosure. Referring to FIG. 7, the system includes a master node 11 and a slave node 12 which are PTP-based network devices, in the illustrated embodiment.

The master node 11 and the slave node 12 each include, as components, a PTP layer for synchronizing time in each of a plurality of time domains based on PTP and an offset clock layer that constitutes an upper layer of the PTP layer. Therefore, the configuration of FIG. 7 includes the component of an offset clock layer further to the configuration of FIG. 1 described above.

The PTP layer 110 of the master node 11 is configured to transmit a reference time indicated by the hardware clock of the master node 11 to the PTP layer 120 of the slave node 12. The PTP layer 120 of the slave node 12 is configured to synchronize the hardware clock of the slave node 120 to the transmitted reference time indicated by the hardware clock of the master node 11.

The master node 11 and the slave node 12 may not calculate the offset value of each time domain through packet communications between the PTP layers, but may obtain the offset by transmitting and receiving the offset between offset clock layers.

For example, the master node 11 may have an offset clock layer 111, and the slave node 12 may have an offset clock layer 121. The offset clock layer 111 of the master node 11 may transmit the offset of each of a plurality of time domains to the offset clock layer 121 of the slave node 12. The PTP layer 120 of the slave node 12 may obtain the time in each time domain by applying the offset of each time domain to a reference time indicated by the hardware clock of the slave node 12 after the offset is transmitted to the offset clock layer 121 of the slave node 12.

This allows using the PTP-based configuration of the master node and the slave node with the additional offset clock layers as described above to achieve time synchronization across a plurality of time domains.

Figure 8:
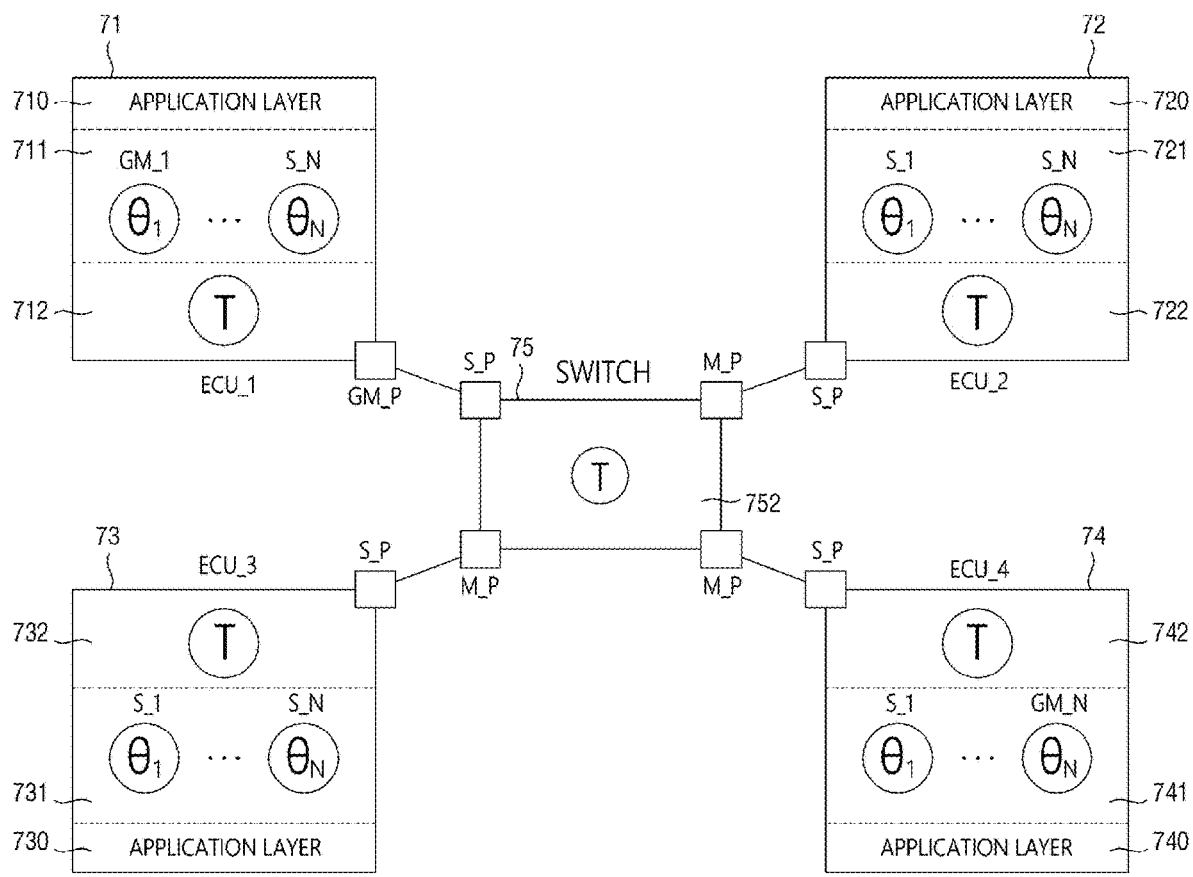
FIG. 8 is a diagram of a configuration of a vehicle network apparatus, according to another embodiment of the present disclosure.

FIG. 8 is a diagram of a configuration of a vehicle network apparatus, according to another embodiment of the present disclosure. Referring to FIG. 8, the vehicle network apparatus includes a plurality of electronic control units, including ECU_1 71, ECU_2 72, ECU_3 73, and ECU_4 74, and a network switch 75 for transmitting/receiving data between the electronic control units. The electronic control units 71, 72, 73, 74 and the network switch 75 may each be designated as a master node or a slave node.

The electronic control units 71, 72, 73, 74 include application layers 710, 720, 730, 740, offset clock layers 711, 721, 731, 741, and PTP layers 712, 722, 732, 742. The network switch 75 includes a PTP layer 752. The offset clock layers 711, 721, 731, and 741 may each provide an interface including function-calling functionality for setting and obtaining a time value for each of the time domains, for setting and obtaining an offset for each time domain, and setting and obtaining a clock mode for each time domain, to an application layer that constitutes an upper layer of each offset clock layer.

The PTP layers 712, 722, 732, 742, 752 may each synchronize a reference time t indicated by a hardware clock between the master node and the slave node.

The offset clock layers 711, 721, 731, 741 may each control the setting and obtaining of offsets θ1, θ2, . . . , θn of a plurality of time domains between the master node and the slave node, and control the setting and obtaining of clock modes for each time domain for the master node and the slave node. The offset clock layers 711, 721, 731, and 741 may set the clock mode of each time domain as a master mode or a slave mode. The setting of the clock mode of each time domain may be independently done regardless of whether the PTP layers 712, 722, 732, and 742 are masters or slaves.

For example, in the first electronic control unit ECU_1 that constitutes the master node, the PTP layer 712 may designate the Ethernet port GM_P as the master. The clock mode of the first time domain of the offset clock layer 711 may be set to the master mode in accord with the Ethernet port GM_P, but the clock mode of an n-th time domain may be set to the slave mode irrespective of the Ethernet port GM_P.

Meanwhile, in the fourth electronic control unit ECU_4 that constitutes the slave node, the PTP layer 742 may designate the Ethernet port S_P as a slave. The clock mode of the first time domain of the offset clock layer 741 may be set to the slave mode in accord with the Ethernet port S_P, but the clock mode of an n-th time domain may be set to the master mode irrespective of the Ethernet port S_P.

Therefore, in synchronizing time across a plurality of time domains by using the PTP layers and the offset clock layers, the master/slave act of the PTP layer and the master/slave act in each time domain by the offset clock layer may be done independently.

Figure 9:
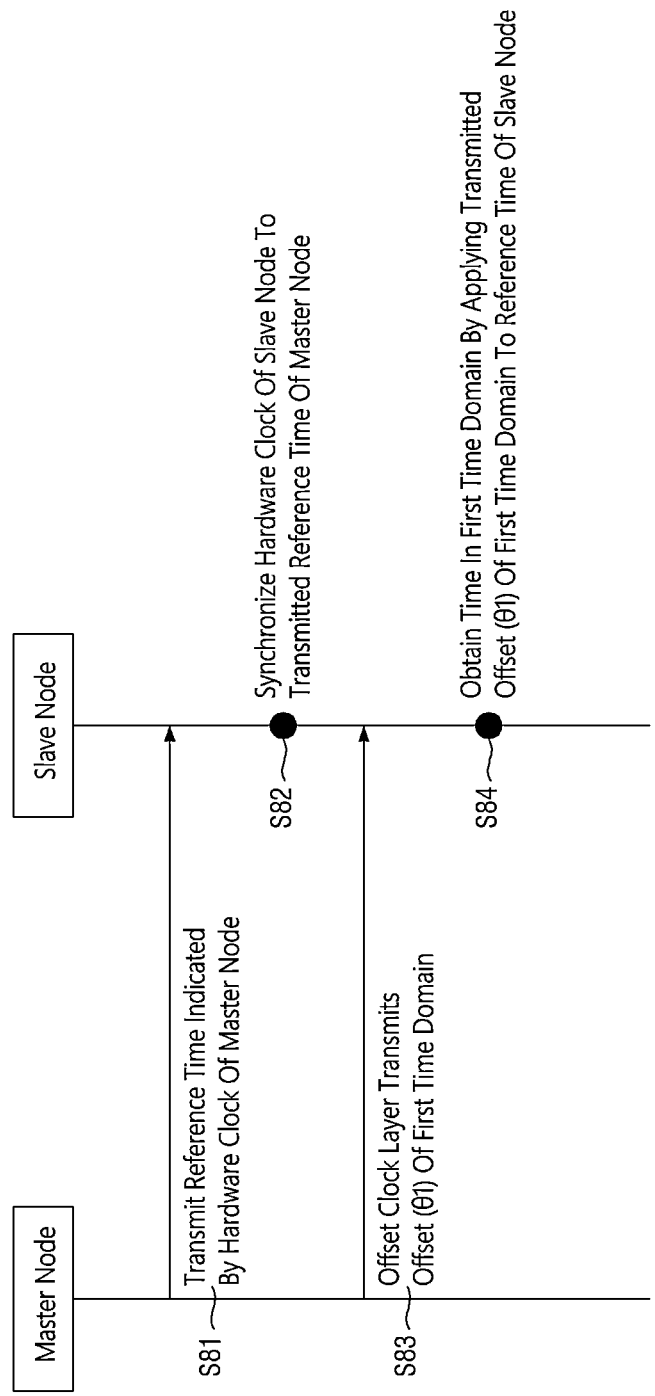
FIG. 9 is a flowchart of a method of synchronizing time across a plurality of time domains between a master node and a slave node, according to another embodiment of the present disclosure.

FIG. 9 is a flowchart of a method of synchronizing time across a plurality of time domains between a master node and a slave node, according to another embodiment of the present disclosure. The respective operation steps shown in FIG. 9 may be performed by the configuration of FIG. 8.

Referring to FIG. 9, in Step S81, the PTP layer of the master node transmits the reference time indicated by the hardware clock of the master node to the PTP layer of the slave node, and in Step S82, the PTP layer of the slave node, synchronizes the hardware clock of the slave node to the reference time indicated by the hardware clock of the master node.

In Step S82, the offset clock layer of the master node transmits the offset $\theta 1$ of the first time domain among the plurality of time domains to the offset clock layer of the slave node.

In Step S83, the PTP layer of the slave node obtains the time in the first time domain by applying the offset $\theta 1$ of the first time domain transmitted to the offset clock layer of the slave node to the reference time indicated by the hardware clock of the slave node.

The method may further include operation steps in which i) the offset clock layer of the master node transmits an offset ($\theta 2$) of a second time domain to the offset clock layer of the slave node, and ii) the PTP layer of the slave node obtains the time in the second time domain by applying the transmitted offset ($\theta 2$) of the second time domain to the reference time indicated by the hardware clock of the slave node. Likewise, the method may proceed with an operation step of applying an offset of each of the remaining time domains among the plurality of time domains other than the first time domain and the second time domain to obtain the time in each time domain.

In at least some examples described above, each of a sync packet and a follow_up packet has a time domain field that is set to a number corresponding to a particular time domain. For example, when a sync message and a follow_up message are used for synchronization in the first time domain, each of the sync message and the follow_up message includes a field set to a number corresponding to the first time domain.

In at least some examples described above, when an offset corresponding to a particular domain is changed (e.g., when the offset ($\theta 1$) of the first time domain is changed), the PTP layer of the master node may transmit a time value in the particular time domain (e.g., the first time domain) to the PTP layer of the slave node using a sync packet and a follow_up packet after a changed offset ($\theta 1$) is applied to the first time domain. The PTP layer of the slave node may calculate a changed offset of the particular time domain (e.g., the changed offset ($\theta 1$) of the first time domain) by using i) the time value in the first time domain with the changed offset (e.g., $\theta 1$) applied and ii) a stored propagation delay.

A system according to an embodiment of the present disclosure may perform an operation of setting each time domain's clock mode of the offset clock layer to the master mode or the slave mode. In this case, when the first time domain's clock mode of the offset clock layer of the master node is set as the master mode, the first time domain's clock mode of the offset clock layer of the slave node may be set as the slave mode. Additionally, when the clock mode of the n-th time domain's clock mode of the offset clock layer of the slave node is set to the master mode, the n-th time domain's clock mode of the offset clock layer of the master node may be set as the slave mode.

As a result, the master/slave acts between the PTP layer and the offset clock layer need not be set to match, and may be set independently of each other.

In an embodiment, each offset clock layer may provide an interface for setting and obtaining a time value for each of the time domains, for setting and obtaining an offset for each time domain, and for setting and obtaining a clock mode for each time domain, to the application layer that constitutes an upper layer of each offset clock layer.

For example, when the application layer of the master node calls a setTime(1, T) function, the PTP layer of the master node may transmit the time value of the first time domain to the PTP layer of the slave node. When the application layer of the slave node calls a getTime(1) function, the method may return an obtained time of the first time domain from the PTP layer of the slave node.

As another example, when the offset clock layer of the master node calls a setOffset(1, $\theta 1$) function, the method may transmit the offset $\theta 1$ of the first time domain to the offset clock layer of the slave node, and when the offset clock layer of the slave node calls a getOffset(1) function, the method may return the transmitted offset $\theta 1$ of the first time domain.

As another example, when the offset clock layer of the master node calls a setMode(1) function, the method may set a clock mode of the first time domain to the master mode and set a clock mode of the first time domain of the slave node to a slave mode. When the offset clock layer calls a getMode(1) function, the method may return the set clock mode of the first time domain.

Meanwhile, the setting of the time value for each of the time domains and the setting of the offset for each of the time domains may proceed with a function called exclusively when the clock mode for each of the time domains of the offset clock layer is a master mode.

Figure 10:
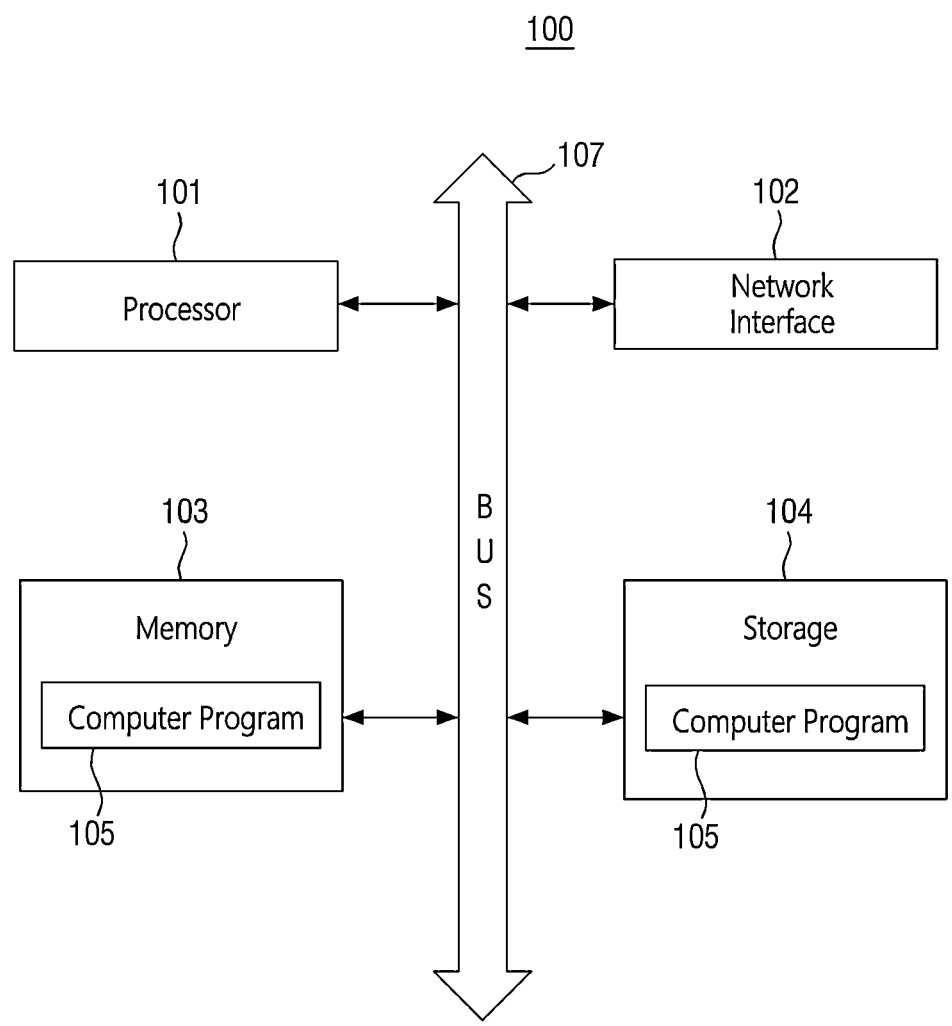
FIG. 10 is a diagram of a hardware configuration of an exemplary computing device capable of implementing methods according to some embodiments of the present disclosure.

FIG. 10 is a hardware configuration diagram of an exemplary computing device 100.

Referring to FIG. 10, the computing device 100 may include one or more processors 101, a bus 107, a network interface 102, a memory 103, which loads a computer program 105 executed by the processors 101, and a storage 104 for storing the computer program 105.

The processor 101 controls overall operations of each component of computing device 100. The processor 101 may be configured to include at least one of a Central Processing Unit (CPU), a Micro Processor Unit (MPU), a Micro Controller Unit (MCU), a Graphics Processing Unit (GPU), or any type of processor well known in the art.

Further, the processor 101 may perform calculations on at least one application or program for executing a method/operation according to various embodiments of the present disclosure. The computing device 100 may have one or more processors.

The memory 103 stores various data, instructions and/or information. The memory 103 may load one or more programs 105 from the storage 104 to execute methods/operations according to various embodiments of the present disclosure. An example of the memory 103 may be a RAM, but is not limited thereto.

The bus 107 provides communication between components of computing device 100. The bus 107 may be implemented as various types of bus such as an address bus, a data bus and a control bus.

The network interface 102 supports wired and wireless internet communication of the computing device 100. The network interface 102 may support various communication methods other than internet communication. To this end, the network interface 102 may be configured to comprise a communication module well known in the art of the present disclosure.

The storage 104 can non-temporarily store one or more computer programs 105. The storage 104 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 105 may include one or more instructions, on which the methods/operations according to various embodiments of the present disclosure are implemented. When the computer program 105 is loaded on the memory 103, the processor 101 may perform the methods/operations in accordance with various embodiments of the present disclosure by executing the one or more instructions.

In an embodiment, the computer program 105 may include computer-executable instructions for causing, when executed in the computing device, the computing device to perform operations (not necessarily in the following order) of (i) calculating and storing, by a PTP layer of the slave node, a propagation delay generated when exchanging a message with the master node, (ii) transmitting, by a PTP layer of the master node, a reference time indicated by a hardware clock of the master node to the PTP layer of the slave node, (iii) synchronizing, by the PTP layer of the slave node, a hardware clock of the slave node to the reference time indicated by the hardware clock of the master node, (iv) transmitting, by the PTP layer of the master node, a time value in a first time domain among the plurality of time domains to the PTP layer of the slave node, the time value being calculated by adding an offset (θ1) of the first time domain to the reference time, (v) calculating, by the PTP layer of the slave node, the offset (θ1) of the first time domain by using the time value in the first time domain and the stored propagation delay, and (vi) obtaining, by the PTP layer of the slave node, the time in the first time domain by applying the calculated offset (θ1) of the first time domain to a reference time indicated by the hardware clock of the slave node.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the preferred embodiments without substantially departing from the principles of the present disclosure. Therefore, the disclosed preferred embodiments of the disclosure are used in a generic and descriptive sense only and not for purposes of limitation.

The invention claimed is:

1. A method for synchronizing time across a plurality of time domains between a master node and a slave node, the method comprising:
    calculating and storing, by a precision time protocol (PTP) layer of the slave node, a propagation delay generated when exchanging a message with the master node;
    transmitting, by a PTP layer of the master node, a reference time indicated by a hardware clock of the master node to the PTP layer of the slave node;
    synchronizing, by the PTP layer of the slave node, a hardware clock of the slave node to the reference time indicated by the hardware clock of the master node;
    transmitting, by the PTP layer of the master node, a time value in a first time domain among the plurality of time domains to the PTP layer of the slave node, wherein the time value in the first time domain is calculated, by the PTP layer of the master node, by adding an offset of the first time domain to the reference time indicated by the hardware clock of the master node;
    calculating, by the PTP layer of the slave node, the offset of the first time domain by using the time value in the first time domain and the stored propagation delay; and
    obtaining, by the PTP layer of the slave node, a time in the first time domain by applying the calculated offset of the first time domain to a reference time indicated by the hardware clock of the slave node.

2. The method of claim 1, further comprising:
    transmitting, by the PTP layer of the master node, a time value in a second time domain among the plurality of time domains to the PTP layer of the slave node, wherein the time value in the second time domain is calculated by adding an offset of the second time domain to the reference time indicated by the hardware clock of the master node; and
    calculating, by the PTP layer of the slave node, the offset of the second time domain by using the time value in the second time domain and the stored propagation delay.

3. The method of claim 1, wherein calculating and storing, by the PTP layer of the slave node, the propagation delay generated when exchanging the message with the master node comprises:
  transmitting, by and from the PTP layer of the slave node to the master node, a Pdelay_Req signal including information on a reference time,
  obtaining information on a reference time at which the PTP layer of the master node receives the Pdelay_Req signal and information on a reference time at which the PTP layer of the master node transmits, to the PTP layer of the slave node, a Pdelay_Resp signal corresponding to the Pdelay_Req signal,
  obtaining, by the PTP layer of the slave node, information on a reference time at which the PTP layer of the slave node receives the Pdelay_Resp signal from the master node, and
  calculating the propagation delay by using a difference between the reference time and the reference time and a difference between the reference time and the reference time.

4. The method of claim 1, wherein transmitting the time value in the first time domain to the PTP layer of the slave node comprises transmitting, by and from the PTP layer of the master node, the time value in the first time domain to the PTP layer of the slave node using a sync packet and a follow_up packet.

5. The method of claim 4, wherein each of the sync packet and the follow_up packet has a time domain field that is set to a number corresponding to the first time domain.

6. The method of claim 1, further comprising:
  when the offset of the first time domain is changed, transmitting, by and from the PTP layer of the master node, a time value in the first time domain to the PTP layer of the slave node using a sync packet and a follow_up packet after a changed offset is applied to the first time domain; and
  calculating, by the PTP layer of the slave node, a changed offset of the first time domain by using i) the time value in the first time domain with the changed offset applied and ii) the stored propagation delay.

7. The method of claim 1, wherein each of the PTP layer of the slave node and the PTP layer of the master node is configured to provide an interface for setting and obtaining a time value for each of the time domains and for setting and obtaining an offset for each of the time domains, to an application layer that constitutes an upper layer of the PTP layer.

8. The method of claim 7, further comprising:
  when the application layer of the master node calls a setTime(1, T) function, transmitting, by the PTP layer of the master node, T which is the time value in the first time domain to the PTP layer of the slave node; and
  when the application layer of the slave node calls a getTime(1) function, returning the obtained time in the first time domain from the PTP layer of the slave node.

9. The method of claim 7, further comprising:
  when the PTP layer of the master node calls a setOffset(1, θ1) function, setting the offset of the first time domain to θ1; and
  when the PTP layer of the slave node calls a getOffset(1) function, returning θ1 that is calculated by using the time value in the first time domain and the stored propagation delay, as the offset of the first time domain.

10. The method of claim 1, wherein the master node and the slave node are each an electronic control unit (ECU) or a network switch.

11. A non-transitory computer-readable medium storing a computer program including computer-executable instructions for causing, when executed in a computing device, the computing device to perform the methods of claim 1.

12. A computing device for synchronizing time across a plurality of time domains between a master node and a slave node, the computing device comprising:
  one or more processors;
  a communication interface configured to communicate with external devices;
  a memory configured to load a computer program that is executed by the processor; and
  a storage configured to store the computer program,
  wherein the computer program includes computer-executable instructions for causing, when executed in the computing device, the computing device to perform operations comprising:
  calculating and storing, by a precision time protocol (PTP) layer of the slave node, a propagation delay generated when exchanging a message with the master node;
  transmitting, by a PTP layer of the master node, a reference time indicated by a hardware clock of the master node to the PTP layer of the slave node;
  synchronizing, by the PTP layer of the slave node, a hardware clock of the slave node to the reference time indicated by the hardware clock of the master node;
  transmitting, by the PTP layer of the master node, a time value in a first time domain among the plurality of time domains to the PTP layer of the slave node, wherein the time value in the first time domain is calculated, by the PTP layer of the master node, by adding an offset of the first time domain to the reference time indicated by the hardware clock of the master node;
  calculating, by the PTP layer of the slave node, the offset of the first time domain by using the time value in the first time domain and a stored propagation delay from the calculating and storing of the propagation delay; and
  obtaining, by the PTP layer of the slave node, the time in the first time domain by applying a calculated offset of the first time domain to a reference time indicated by the hardware clock of the slave node.

13. The computing device of claim 12, wherein the computer program includes computer-executable instructions for causing, when executed in the computing device, the computing device to further perform operations comprising:
  transmitting, by the PTP layer of the master node, a time value in a second time domain among the plurality of time domains to the PTP layer of the slave node after the time value is calculated by adding an offset of the second time domain to the reference time indicated by the hardware clock of the master node; and
  calculating, by the PTP layer of the slave node, the offset of the second time domain by using the time value in the second time domain and the stored propagation delay.

14. The computing device of claim 12, wherein calculating and storing, by the PTP layer of the slave node, the propagation delay generated when exchanging a message with the master node comprises:
  transmitting, by and from the PTP layer of the slave node, a Pdelay_Req signal including information on a reference time to the master node,
  obtaining information on a reference time at which the PTP layer of the master node receives the Pdelay_Req signal and information on a reference time at which the PTP layer of the master node transmits to the PTP layer of the slave node a Pdelay_Resp signal corresponding to the Pdelay_Req signal, obtaining, by the PTP layer of the slave node, information on a reference time at which the PTP layer of the slave node receives the Pdelay_Resp signal from the master node, and calculating the propagation delay by using a difference between the reference time and the reference time and a difference between the reference time and the reference time.

15. The computing device of claim 12, wherein transmitting the time value in the first time domain to the PTP layer of the slave node comprises transmitting, by and from the PTP layer of the master node, the time value in the first time domain to the PTP layer of the slave node using a sync packet and a follow_up packet.

16. The computing device of claim 15, wherein each of the sync packet and the follow_up packet has a time domain field that is set to a number corresponding to the first time domain.

17. The computing device of claim 12, wherein the computer program includes computer-executable instructions for causing, when executed in the computing device, the computing device to further perform operations comprising:

when the offset of the first time domain is changed, transmitting, by and from the PTP layer of the master node, a time value in the first time domain to the PTP layer of the slave node through a sync packet and a follow_up packet after a changed offset is applied the first time domain; and calculating, by the PTP layer of the slave node, the changed offset of the first time domain by using the time value in the first time domain with the changed offset applied and the stored propagation delay.

18. The computing device of claim 12, wherein each of the PTP layer of the master node and the PTP layer of the slave node provides an interface for setting and obtaining a time value for each of the time domains and for setting and obtaining an offset for each of the time domains, to an application layer that constitutes an upper layer of the PTP layer.

19. The computing device of claim 18, wherein the computer program includes computer-executable instructions for causing, when executed in the computing device, the computing device to further perform operations comprising:

when the application layer of the master node calls a setTime(1, T) function, transmitting, by the PTP layer of the master node, T which is the time value in the first time domain to the PTP layer of the slave node; and when the application layer of the slave node calls a getTime(1) function, returning the obtained time in the first time domain from the PTP layer of the slave node.

20. The computing device of claim 18, wherein the computer program includes computer-executable instructions for causing, when executed in the computing device, the computing device to further perform operations comprising:

when the PTP layer of the master node calls a setOffset(1, θ1) function, setting the offset of the first time domain to θ1; and when the PTP layer of the slave node calls a getOffset(1) function, returning θ1 that is calculated by using the time value in the first time domain and the stored propagation delay, as the offset of the first time domain.

* * * * *